(12) United States Patent
Lagnado et al.

(10) Patent No.: US 11,264,808 B2
(45) Date of Patent: Mar. 1, 2022

(54) STACKABLE CHARGING

(71) Applicant: HEWLETT-PACKARD DEVELOPMENT COMPANY, L.P., Spring, TX (US)

(72) Inventors: Isaac Lagnado, Houston, TX (US); Steven Petit, Houston, TX (US); Eric Chen, Houston, TX (US); Mats Anders Krister Luckman, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 65 days.

(21) Appl. No.: 16/479,945

(22) PCT Filed: Sep. 22, 2017

(86) PCT No.: PCT/US2017/052853
§ 371 (c)(1),
(2) Date: Jul. 23, 2019

(87) PCT Pub. No.: WO2019/059917
PCT Pub. Date: Mar. 28, 2019

(65) Prior Publication Data
US 2020/0381924 A1 Dec. 3, 2020

(51) Int. Cl.
*H02J 7/00* (2006.01)
*G06F 1/28* (2006.01)

(52) U.S. Cl.
CPC ............. *H02J 7/0013* (2013.01); *G06F 1/28* (2013.01)

(58) Field of Classification Search
USPC ........................................................ 320/137
See application file for complete search history.

(56) References Cited

U.S. PATENT DOCUMENTS

| 5,814,968 | A | 9/1998 | Lovegreen et al. |
| 8,901,779 | B2 | 12/2014 | Kesler et al. |
| 9,583,969 | B2 | 2/2017 | Takano |
| 9,667,076 | B2 | 5/2017 | Lau et al. |
| 2005/0213280 | A1* | 9/2005 | Azrai ................. H01L 23/5223 361/271 |
| 2008/0315826 | A1 | 12/2008 | Alberth et al. |
| 2013/0175986 | A1 | 7/2013 | Senatori |
| 2014/0145673 | A1 | 5/2014 | Heilbrun |
| 2014/0361734 | A1 | 12/2014 | Yamazaki et al. |
| 2015/0326060 | A1 | 11/2015 | Young |
| 2018/0250159 | A1* | 9/2018 | DeSeve, III ....... A41D 13/0051 |
| 2020/0381924 | A1* | 12/2020 | Lagnado ................ G06F 1/26 |

OTHER PUBLICATIONS

S40i Tablet, Chromebook & Laptop Charge Trolley.

* cited by examiner

*Primary Examiner* — Mohammed Alam
(74) *Attorney, Agent, or Firm* — HPI Patent Department

(57) ABSTRACT

In an example implementation according to aspects of the present disclosure, a method may include determining how many computing devices are in a stackable configuration and selecting an algorithm for charging the computing devices while in the stackable configuration. The method may include, based on the number of computing devices in the stackable configuration, charging the computing devices according to the selected algorithm.

20 Claims, 3 Drawing Sheets

STACKABLE CHARGING

BACKGROUND

The emergence and popularity of mobile computing has made portable computing devices, due to their compact design and light weight, a staple in today's marketplace. However, due to their portable nature, use of portable computing devices, such as notebook computers, are limited by their battery life. Various markets, such as education or medical markets, have a necessity to ensure that a number of portable computing devices are charged and readily available for use. As a result, storage containers, known as charging trolleys or carts, have the ability for each portable computing device to be stored at a common place, but individually connected to a power supply.

DETAILED DESCRIPTION

Examples disclosed herein provide the ability for computing devices to be charged while stacked with respect to each other in a stackable configuration (e.g., stacked horizontally or vertically). As will be further described, a single power supply connected to one of the computing devices may be used to charge all the computing devices while in the stackable configuration. As an example, charging all the computing devices may be accomplished via wireless charging or surface charging.

Wireless charging may include the transmission of electrical power between computing devices in the stackable configuration, all without using solid wires or conductors, but rather, for example, via electromagnetic fields. Surface charging, as will be further described, may include the use of conductive surfaces between the computing devices in the stackable configuration, to receive power from the single power supply. In addition, various algorithms may be used for determining how each computing device in the stackable configuration should be charged. As an example, factors considered for choosing an algorithm may include the number of computing devices in the stackable configuration and prioritization of computing devices stacked higher in the stackable configuration.

Figure 1:
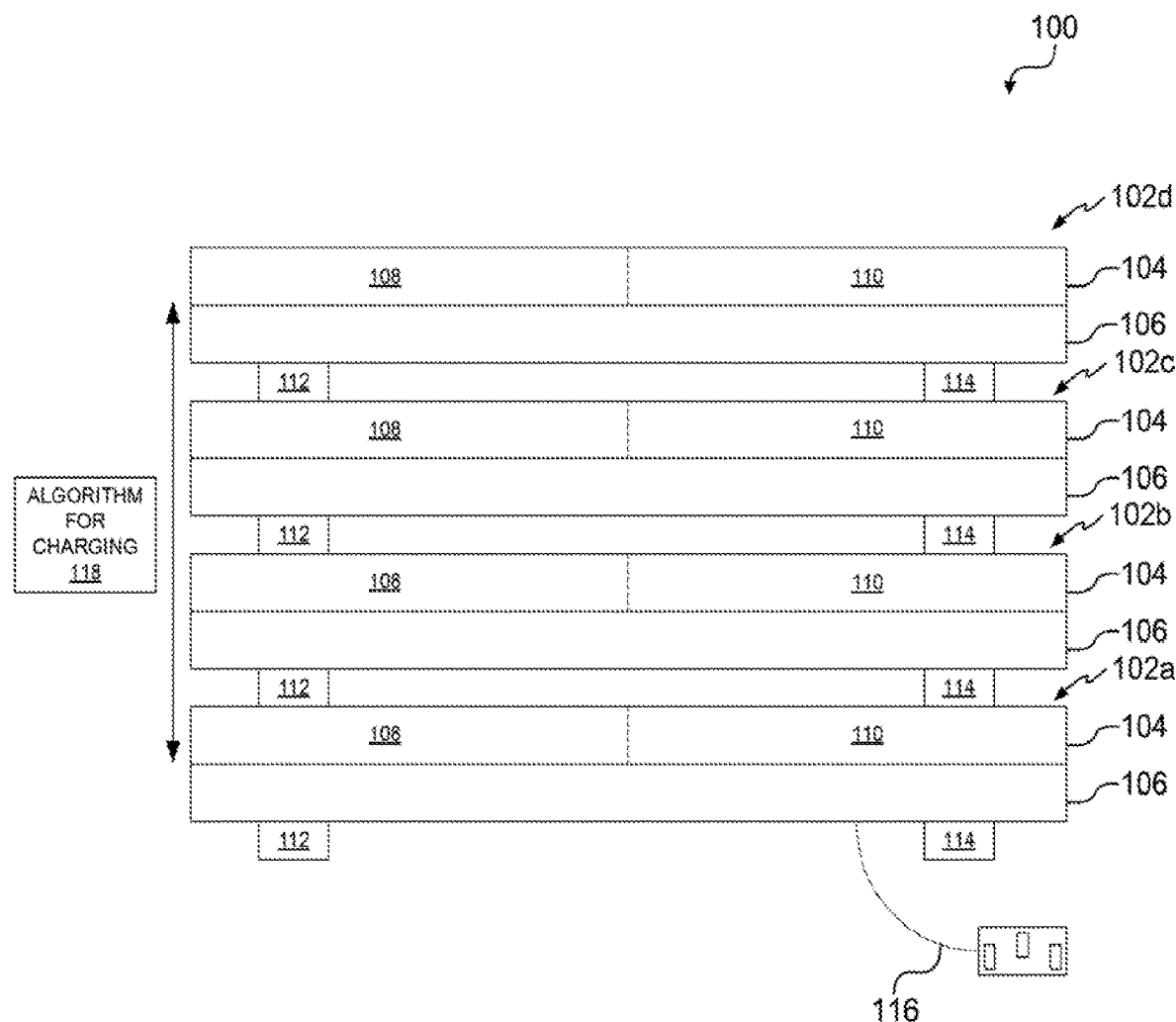
FIG. 1 illustrates a system of computing devices in a stackable configuration for charging from a single power supply, according to an example.

With reference to the figures, FIG. 1 illustrates a system 100 of computing devices 102a-d in a stackable configuration for charging from a single power supply 116, according to an example. The power supply 116 may be connected directly to the computing device 102a or to a charging mat/surface that can be used to charge the computing devices 102a-d. As will be further described, conductive contacts on the surfaces of the computing devices allow for the computing devices to be charged from the single power supply, via surface charging between the computing devices. Although a horizontal stacking of the computing devices 102a-d is illustrated, computing devices may also be stacked in a vertical orientation (e.g., bookshelf surface charging), as long as the conductive contacts of each computing device makes contact with the adjacent computing device, or a common charging mat. Although four computing devices 102a-d are illustrated, the number of computing devices may vary. Examples of computing devices include, but are not limited to, notebook computers, tablet computers, and smartphones. Notebook computers will be described as the computing devices further herein.

As illustrated, each computing device (e.g., notebook computer) includes a display member 104 and a base member 106 that may be rotatably connected to each other. An outer surface of the display member 104 may be split into electrically distinct metal surfaces, such as the two conductive surfaces 108, 110 illustrated. Similarly, the base member 106 of a first computing device may include conductive surfaces 112, 114, for example, to electrically connect to conductive surfaces 108, 110, respectively of a second computing device. As an example, the conductive surfaces 112, 114 of the base member 106 may correspond to the rubber feet found along the bottom surface of the base member 106 (e.g., injected with conductive material), which may also be used for traction purposes. As an example, conductive surfaces could also include other surfaces beyond top and bottom, for example an edge surface as well, as this could allow for a different type of charging configuration, such as the "bookshelf" configuration mentioned above. For example, each computing device may be disposed vertically on top of a charging mat, where the edge of the computing device provides the conductive surface with the charging mat.

Although FIG. 1 illustrates each of the computing devices 102a-d arranged in a particular orientation with respect to each other (e.g., bottom-top, bottom-top, etc.), each computing device could be rotated and or inverted as it is added to the stack. For example, the conductive surfaces do not necessarily have to be uniform (e.g., top surface of a computing device connected to the bottom surface of the next computing device). As an example, each computing device has the ability to switch its conductive surfaces between a transmitter and receiver. As a result, if a computing device is inverted when it is added to the stack, the conductive surfaces on the display member of the computing device may be switched to a receiver in order to electrically connect with the computing device lower on the stack. The conductive surfaces on the base member of the computing device may then be switched to a transmitter, for charging the next computing device add to the stack. Similarly, the two conductive surfaces, for example, on the display member or base member, could allow for the unit to be rotated 180 degrees without impacting its charging receive or transmitting ability. As a result, the orientation of the computing devices do not have to be uniform (i.e., each computing device could be inverted (top or bottom) and could also be rotated (0 or 180 degrees), and the charging described herein may still function from one computing device to the next.

As illustrated, the conductive surfaces 108, 110 of the display member 104 and the conductive surfaces 112,114 of the base member 106 allow for the computing devices to be stacked on top of each other in a stackable configuration. By electrically connecting the computing devices 102a-d to each other via the conductive surfaces, a single power supply 116, for example, that may be connected to the computing device 102a at the bottom of the stack (or possibly at any point in the stack), may be used for charging all the computing devices 102a-d. As mentioned above, although four computing devices are illustrated, the number of computing devices for charging in the stackable configuration may vary. As will be further described, an algorithm for charging 118 may be used charging the computing devices 102a-d. The double-sided arrow indicates that the direction of power for charging, originating from the power supply 116, may vary, based according to the algorithm used.

As an example, the algorithm 118 chosen for charging the computing devices 102a-d may be manually selected or automated. As an example of automatic selection, the algorithm chosen may provide for efficient charging of the computing devices 102a-d. Once selected, when power is transferred, for example, from a computing device lower on the stack to a computing device higher on the stack, the computing device lower on the stack may pass the algorithm used for charging to the computing device higher on the stack. As a result, the computing device can charge according to the algorithm received. Similarly, the algorithm used may be passed further up the stack to higher computing devices. A manual method can also be described in which each computing device is pre-configured by the user to a specific algorithm. Power that is passed between the current computing device and the neighboring computing device is determined solely upon the algorithm pre-configured on the current system. With a manual method, there is no need for the added complexity of communicating the algorithm between the computing devices, instead each computing device provides its own pre-configured algorithm on the energy it consumes and passes up the stack.

As an example, a first algorithm includes providing an equal charge from the power supply 116 to each of the computing devices 102a-d in the stackable configuration. In order to determine the equal charge provided to each computing device in the stackable configuration, the number of computing devices in the stack may be determined. As an example, once a computing device determines that there are no other computing devices stacked above it (e.g., computing device 102d), that computing device may communicate this information to the computing devices below it (e.g., computing devices 102a-c). Once this information reaches the computing device lowest in the stack (e.g., computing device 102a), the number of computing devices in the stack may be determined.

Upon making this determination, the total power output provided by the power supply 116 (e.g., 120 W) may be divided by the total number of computing devices in the stack. Referring to computing devices 102a-d, each computing device may consume 30 W for charging. As an example, computing device 102a may consume 30 W for charging and provide 90 W to computing device 102b. Computing device 102b may then consume 30 W for charging and provide 60 W to computing device 102c. Finally, computing device 102c may then consume 30 W for charging and provide 30 W to computing device 102d. As an example, the equal charge consumed by each computing device may dynamically change if computing devices are added to or removed from the stack. In addition, based on the design of the conductive surfaces on the display and base members 104, 106, and current limitations, the amount of power flowing from one computing device to another may be limited as well. Lastly, as charge levels below a minimum trickle charge may not prove effective (e.g., anything below 15 W), there may be a limit on the number of computing devices that can be added to the stack, based on this algorithm (e.g., not more than 8 computing devices).

As an example, a second algorithm includes prioritizing the charging of computing devices higher in the stackable configuration. This algorithm may be particularly useful if a user desires for the computing devices higher on the stack to be fully charged before computing devices lower on the stack. As an example, 120 W is delivered to computing device 102a by power supply 116. Computing device 102a detects computing device 102b on the stack and passes on 120 W to computing device 102b. Computing device 102b detects computing device 102c on the stack and passes on 120 W to computing device 102c. Computing device 102c detects computing device 102d on the stack and passes on 120 W to computing device 102d. Computing device 102d does not detect any units above it and charges using the 120 W initially provided by power supply 116. Once computing device 102d is completed charging, it turns off its power receiver. As a result, computing device 102c starts charging with 120 W of power. This may continue until all computing devices down the stack are charged completely. Similar to the first algorithm, as additional computing are added to the stack, the 120 W may be delivered back to the top of the stack, to ensure that the computing devices at the top of the stack are charged first.

As an example, a third algorithm includes ensuring that each of the computing devices in the stackable configuration are charged to a first charge level (e.g., 50%) before being charged to a second charge level that is higher than the first charge level (e.g., 100%). Additional charge levels may be included in the algorithm besides just the two charge levels. As an example, as power is delivered from the power supply 116 at the bottom of the stack, power may be allocated to each computing device to reach the first charge level starting from the bottom to the top. Upon reaching the top, power may then be allocated to each computing device to reach the second charge level starting from the top back down to the bottom.

For example, as 120 W is delivered to computing device 102a by power supply 116, if computing device 102a is charged to at least the first charge level (e.g., 50%), it passes the whole 120 W to computing device 102b. Otherwise, a portion of the 120 W (e.g., 30 W) is consumed by computing device 102a for charging, and the remainder is passed to computing device 102b. A similar logic is applied for each computing device remaining in the stack, until the top computing device is reached (e.g., computing device 102d). Once the top computing device is reached (e.g., computing device 102d), the remaining power left from the power supply 116 is used to charge computing device 102d to the second charge level (e.g., 100%). Once the computing device 102d reaches 100%, it switches off its power receiver, and computing device 102c is charged until it reaches 100%. This process may continue until all computing devices down the stack are charged to the second charge level.

As an example, rather than prioritizing the charging of computing devices higher in the stackable configuration, a fourth algorithm includes prioritizing the charging of computing devices in the stackable configuration with the lowest charged battery. As an example, the charge level of each computing device in the stackable configuration is determined. Once that determination is made, the computing devices are ranked by the amount of charge level left in their batteries. The computing device with the lowest charge level is charged first. If multiple computing devices have the same low charge level, then the power from the power supply may be allocated equally between those computing devices. Once the charge level of the computing devices that are charging reach the charge level of the computing devices next on the ranked list, the power from the power supply is again equally allocated to also charge these additional computing devices. This continues until all the computing devices in the stackable configuration are charged completely.

As an example, although separate algorithms were described above, they could be utilized in conjunction with each other. With regards to combining the third and fourth algorithms, if 50% is configured as the first charge threshold, then all computing devices which are not at 50% yet may share the total available power (e.g., sharing of the 120 W of total power). If one of the charging computing devices reaches 50%, then the power may be shared among the remaining computing devices, until all computing devices reach the first threshold of 50%. The charging algorithm continues in a similar fashion for each threshold that is configured. Similar to above, the third algorithm could also be used in conjunction with the second algorithm, such that once the computing devices below 50% are identified, the system with highest priority (closest to top) gets the full power, until it reaches 50%. Once the 50% threshold is met, then the charging is handed off to the next highest priority system. The charging algorithm continues in a similar fashion for each threshold that is configured.

Figure 2:
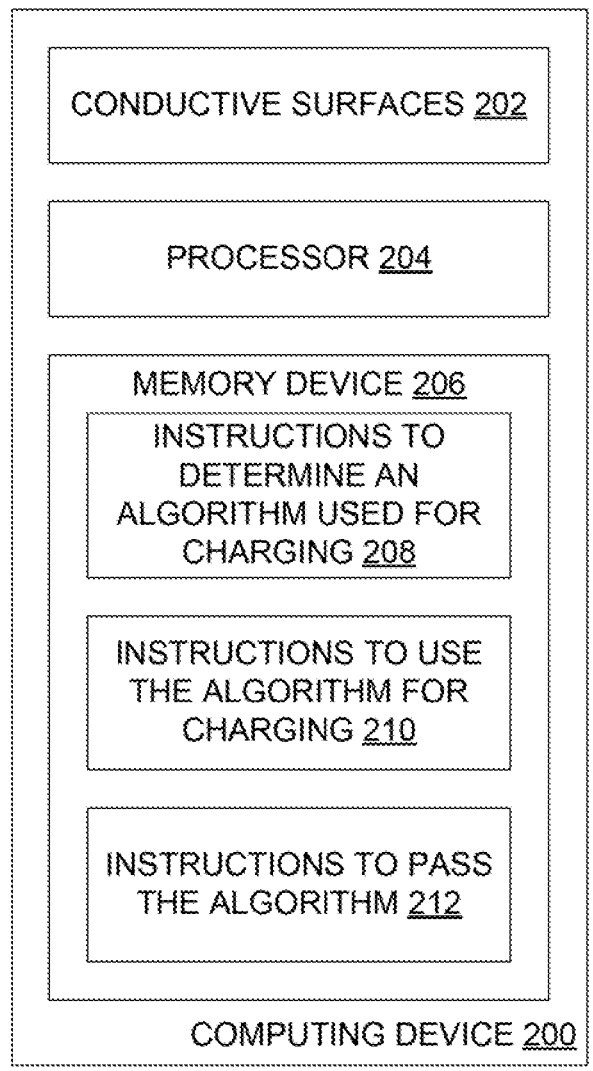
FIG. 2 illustrates a computing device that may be stacked in the stackable configuration with other computing devices for charging, according to an example.

FIG. 2 illustrates a computing device 200 that may be stacked in a stackable configuration with other computing devices for charging, according to an example. Computing device 200 may correspond to one of the computing devices 102a-d illustrated in FIG. 1. The computing device 200 includes conductive surfaces 202 that allow for it to be electrically connected with the other computing devices in the stackable configuration. Referring back to FIG. 1, the conductive surfaces 202 may correspond to the conductive surfaces 108, 110 on the display member 104 and conductive surfaces 112, 114 on the base member 106 of, for example, a notebook computer.

The computing device 200 depicts a processor 204 and a memory device 206 and, as an example of the computing device 200 performing its operations, the memory device 206 may include instructions 208-212 that are executable by the processor 204. Thus, memory device 206 can be said to store program instructions that, when executed by processor 204, implement the components of the computing device 200. The executable program instructions stored in the memory device 206 include, as an example, instructions to determine an algorithm used for charging (208), instructions to use the algorithm for charging (210), and instructions to pass the algorithm (212).

Instructions to determine an algorithm used for charging (208) represent program instructions that when executed by the processor 204 cause the computing device 200 to determine, from a computing device stacked below computing device 200, an algorithm used for charging the computing devices stacked in the stackable configuration. For example, one of the algorithms described above may be selected for charging all the computing devices in the stackable configuration. As the algorithm selected is passed up to all the computing devices in the stack, charging is performed according to the algorithm.

Instructions to use the algorithm for charging (210) represent program instructions that when executed by the processor 204 cause the computing device 200 to use the algorithm for charging the computing device 200, for example, via a power supply connected to a computing device stacked at the bottom of the stackable configuration. For example, if the first algorithm described above is chosen, where an equal charge is provided from the power supply to each of the computing devices in the stackable configuration, computing device 200 uses the power allocated to it, and then passes the remaining power available from the power supply to the computing devices higher on the stack.

If the second algorithm described above is chosen, where prioritizing the charging of computing devices higher in the stackable configuration is taken into consideration, the computing device 200 determines whether it is the highest computing device on the stack, or whether there are other computing devices higher on the stack. If there is a computing device higher on the stack, all the power available from the power supply is transmitted from the computing device 200 to the computing device higher on the stack. Otherwise, computing device 200 uses the power from the power supply to charge before sending the power back down to computing devices lower on the stack. Rather than prioritizing the charging of computing devices higher in the stackable configuration, if the fourth algorithm is chosen, the computing device 200 determines whether it has the lowest battery charge level, or whether other computing devices in the stackable configuration has a lower battery charge level. Once the battery level of each computing device is determine, they are ranked to determine the priority of charging for each computing device.

If the third algorithm described above is chosen, where each of the computing devices in the stackable configuration are charged to a first charge level before being charged to a second charge level, the computing device 200 acts accordingly, based on where it is located in the stack. If there are other computing devices higher on the stack, the computing device 200 determines whether its charge level is above or below the first charge level. If below the first charge level, a portion of the power available from the power supply is allocated to the computing device 200 for charging to at least the first charge level, and the remaining power is transmitted to the other computing devices higher on the stack. If the charge level of the computing device 200 is above the first charge level, power from the power supply is transmitted from the computing device 200 to the other computing devices higher on the stack. If the computing device 200 is on top of the stackable configuration, the computing device 200 uses the remaining power available from the power supply for charging to the second charge level, before the power is transmitted back down to the other computing devices on the stack to charge to the second charge level (e.g., 100%).

Instructions to pass the algorithm (212) represent program instructions that when executed by the processor 204 cause the computing device 200 to pass the algorithm to computing devices stacked above the computing device 200. As a result, all computing devices in the stackable configuration charge according to the same algorithm.

Memory device 206 represents generally any number of memory components capable of storing instructions that can be executed by processor 204. Memory device 206 is non-transitory in the sense that it does not encompass a transitory signal but instead is made up of at least one memory component configured to store the relevant instructions. As a result, the memory device 206 may be a non-transitory computer-readable storage medium. Memory device 206 may be implemented in a single device or distributed across devices. Likewise, processor 204 represents any number of processors capable of executing instructions stored by memory device 206. Processor 204 may be integrated in a single device or distributed across devices. Further, memory device 206 may be fully or partially integrated in the same device as processor 204, or it may be separate but accessible to that device and processor 204.

In one example, the program instructions 208-212 can be part of an installation package that when installed can be executed by processor 204 to implement the components of the computing device 200. In this case, memory device 206 may be a portable medium such as a CD, DVD, or flash drive or a memory maintained by a server from which the installation package can be downloaded and installed. In another example, the program instructions may be part of an application or applications already installed. Here, memory device 206 can include integrated memory such as a hard drive, solid state drive, or the like.

Figure 3:
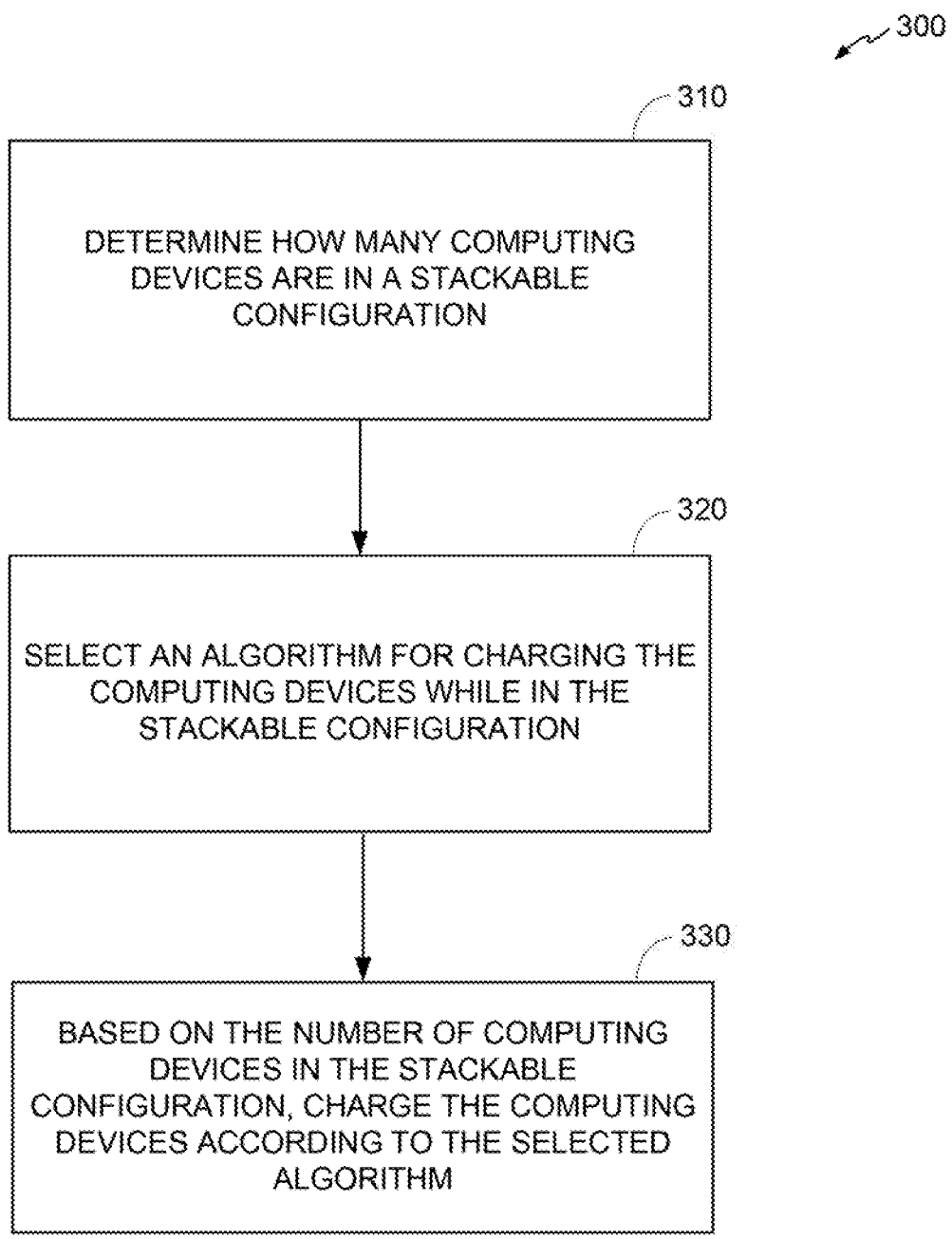
FIG. 3 is a flow diagram in accordance with an example of the present disclosure.

FIG. 3 is a flow diagram 300 of steps taken by a computing device to implement a method for computing devices stacked on top of each other in a stackable configuration to be charged, according to an example. As an example, the method may be performed by the computing device lowest on the stack, which may be connected to the power supply used for charging all the computing devices in the stack. Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

At 310, the computing device determines how many computing devices are in the stackable configuration. As an example, this information may be received from the computing device highest on the stack. For example, once a computing device determines that there are no other computing devices stacked above it, that computing device may communicate this information to the computing devices below it. Once this information reaches the computing device lowest in the stack, the number of computing devices in the stack may be determined.

At 320, the computing device selects an algorithm for charging the computing devices while in they are in the stackable configuration. As an example, the algorithm chosen for charging the computing devices may be manually selected or automated. As an example of automatic selection, the algorithm chosen may provide for efficient charging of the computing devices in the stackable configuration.

At 330, based on the number of computing devices in the stackable configuration, the computing device, and other computing devices in the stackable configuration, charge according to the selected algorithm. As an example of a first algorithm that provides an equal charge from a power supply to each of the computing devices in the stackable configuration, the computing device connected to the power supply may consume the equal charge for charging, and then provide the total power available from the power supply minus the equal charge to the computing device stacked above. This process proceeds until the computing device on the top of the stack is reached.

As an example of a second algorithm that prioritizes charging of the computing devices higher in the stackable configuration, the computing device, once receiving power from the power supply, passes the power to a computing device stacked above. The power continues to be passed up the stack until the computing device on the top of the stack is reached. Once the computing device on the top of the stack is charged, the power returns back down the stack to each computing device, until all computing devices in the stack are charged.

As an example of a third algorithm that ensures that each of the computing devices in the stack are charged to a first charge level before being charged to a second charge level that is higher than the first charge level, the computing devices are charged to the first charge level as power is delivered up the stackable configuration, and the computing devices are charge to the second charge level as power is delivered back down the stackable configuration. As an example of a fourth algorithm that prioritizes charging of the computing devices with lower battery charge levels, the battery level of each computing device is determined and ranked from lowest to highest, in order to determine the order of which computing devices are charged first.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   determining how many computing devices are in a stackable configuration;
   selecting, by a second computing device stacked below a first computing device, an algorithm for charging the computing devices while in the stackable configuration;
   based on the number of computing devices in the stackable configuration, charging the first computing devices, via a power supply connected to a computing device stacked at a bottom of the stackable configuration, according to the selected algorithm;
   determining if a charge level of the first computing device is charged to a first charge level; and
   if the charge level of the first computing device is above the first charge level, diverting the power supply to a computing device stacked above the first computing device.

2. The method of claim 1, wherein selecting the algorithm comprises selecting a first algorithm that provides an equal charge from a power supply to each of the computing devices in the stackable configuration.

3. The method of claim 2, comprising:
   a first computing device connected to the power supply consuming the equal charge for charging; and
   the first computing device providing a total power available from the power supply minus the equal charge to a second computing device stacked above the first computing device in the stackable configuration.

4. The method of claim 1, wherein selecting the algorithm comprises selecting a second algorithm that prioritizes charging of the computing devices higher in the stackable configuration.

5. The method of claim 4, comprising:
a first computing device receiving power from a power supply;
passing the power received from the power supply to a second computing device stacked above the first computing device; and
upon the second computing device completing charging and turning off its power receiver, the first computing device consuming the power from the power supply for charging.

6. The method of claim 1, wherein selecting the algorithm comprises selecting a third algorithm that ensures that each of the computing devices are charged to a first charge level before being charged to a second charge level that is higher than the first charge level.

7. The method of claim 6, wherein the computing devices are charged to the first charge level as power is delivered up the stackable configuration, and the computing devices are charge to the second charge level as power is delivered back down the stackable configuration.

8. The method of claim 1, wherein selecting the algorithm comprises selecting a fourth algorithm that prioritizes charging of the computing devices with lower battery charge levels.

9. A first computing device to be stacked in a stackable configuration with other computing devices, the first computing device comprising:
a first surface with first and second conductive surfaces;
a second surface opposite the first surface with third and fourth conductive surfaces; and
a processor to:
determine, from a second computing device stacked below the first computing device, an algorithm used for charging the computing devices stacked in the stackable configuration;
use the algorithm for charging the first computing device via a power supply connected to a computing device stacked at a bottom of the stackable configuration;
determine if a charge level of the first computing device is charged to a first charge level; and
if the charge level of the first computing device is above the first charge level, divert the power supply to a computing device stacked above the first computing device.

10. The first computing device of claim 9, wherein the processor is to pass the algorithm to a third computing device stacked above the first computing device.

11. The first computing device of claim 10, wherein the third and fourth conductive surfaces are electrically connected to conductive surfaces of the second computing device and the first and second conductive surfaces are electrically connected to conductive surfaces of the third computing device.

12. The first computing device of claim 11, wherein power from the power supply for charging is passed via the electrical connections between the conductive surfaces of the computing devices.

13. A non-transitory computer-readable storage medium comprising program instructions which, when executed by a processor, to cause the processor of a first computing device stacked in a stackable configuration with other computing devices to:
determine, from a second computing device stacked below the first computing device, an algorithm used for charging the computing devices stacked in the stackable configuration;
use the algorithm for charging the first computing device via a power supply connected to a computing device stacked at a bottom of the stackable configuration;
pass the algorithm to a third computing device stacked above the first computing device;
determine if a charge level of the first computing device is charged to a first charge level; and
if the charge level of the first computing device is above the first charge level, divert the power supply to the third computing device stacked above the first computing device.

14. The non-transitory computer-readable storage medium of claim 13, wherein the computing devices stacked in the stackable configuration are electrically connected to each other via conductive surfaces of the computing devices.

15. The non-transitory computer-readable storage medium of claim 14, wherein power from the power supply for charging is passed via the electrical connections between the conductive surfaces of the computing devices.

16. The first computing device of claim 9, wherein the processor is to determine if a charge level of the first computing device is charged to a first charge level.

17. The first computing device of claim 16, wherein the processor is to, if the charge level of the first computing device is below a first charge level, divert a first portion of the power supply to the first computing device and a second portion of the power supply to a computing device stacked above the first computing device.

18. The first computing device of claim 16, wherein the processor is to, if the charge level of the first computing device is above a first charge level, divert the power supply to a computing device stacked above the first computing device.

19. The first computing device of claim 9, wherein the algorithm is to prioritize charging computer devices higher in the stackable configuration.

20. The first computing device of claim 9, wherein the computing devices stacked in the stackable configuration are electrically connected to each other via conductive surfaces of the computing devices.

* * * * *